United States Patent [19]

Lazecki et al.

[11] Patent Number: 5,029,402

[45] Date of Patent: Jul. 9, 1991

[54] SLIDING GAUGE

[76] Inventors: Renë Lazecki, Heldaustrasse 160 CH-9470 Buchs; Jürg Kessler, Bülsweg, CH-9472 Grabs, both of Switzerland; Albrecht Wössner, Wingerta, FL-9496 Balzers; Christian E. Thöny, Im Tröxle 27, FL-9494 Schaan, both of Fed. Rep. of Germany

[21] Appl. No.: 250,621

[22] PCT Filed: Dec. 23, 1987

[86] PCT No.: PCT/EP87/00817

§ 371 Date: Oct. 19, 1988

§ 102(e) Date: Oct. 19, 1988

[87] PCT Pub. No.: WO88/05151

PCT Pub. Date: Jul. 14, 1988

[30] Foreign Application Priority Data

Dec. 24, 1986 [DE] Fed. Rep. of Germany ....... 3644444

[51] Int. Cl.$^5$ .......................... G01B 3/20; G01B 21/02
[52] U.S. Cl. .......................................... 33/784; 33/810
[58] Field of Search ................. 33/783, 784, 806, 810, 33/811, 812, 819, 820

[56] References Cited

U.S. PATENT DOCUMENTS

| 3,029,518 | 4/1962 | Raymond | 33/708 |
|---|---|---|---|
| 3,805,393 | 4/1974 | Lemelson | 33/784 X |
| 4,077,129 | 3/1978 | Nishikata | 33/784 |
| 4,226,024 | 10/1980 | Westerberg | . |
| 4,229,883 | 10/1980 | Kobashi | 33/78 X |
| 4,399,613 | 8/1983 | Nishikata | 33/784 X |
| 4,435,904 | 3/1984 | Logan et al. | 33/784 |
| 4,459,749 | 7/1984 | Rieder | 33/784 |
| 4,586,260 | 5/1986 | Baxter et al. | 33/784 X |
| 4,612,656 | 9/1986 | Suzuki et al. | 33/784 |

FOREIGN PATENT DOCUMENTS

| 410975 | 8/1966 | Australia . | |
|---|---|---|---|
| 2832986 | 7/1978 | Fed. Rep. of Germany . | |
| 3026906 | 7/1980 | Fed. Rep. of Germany . | |
| 3128656 | 7/1981 | Fed. Rep. of Germany . | |
| 3330396 | 8/1983 | Fed. Rep. of Germany . | |
| 8605400 | 2/1986 | Fed. Rep. of Germany . | |
| 861248 | 5/1986 | Fed. Rep. of Germany . | |
| 741729 | 12/1932 | France | 33/DIG. 1 |
| 0154011 | 9/1982 | Japan | 33/384 |
| 0153101 | 9/1983 | Japan | 33/810 |
| 219820 | 3/1985 | Japan . | |
| 2157831 | 4/1984 | United Kingdom . | |
| 2156989 | 3/1985 | United Kingdom . | |

Primary Examiner—Harry N. Haroian
Attorney, Agent, or Firm—Kokjer, Kircher, Bradley, Wharton, Bowman & Johnson

[57] ABSTRACT

A sliding gauge for measuring animal carcasses for slaughter, tree trunks, whole cheese or other objects. The sliding gauge includes a rod and a slide mounted for sliding movement on the rod by a form-locking guide arrangement. The rod and the slide are each equipped with a jaw projecting therefrom at a right angle, such that the jaws are parallel. Longitudinal markings and at least one length sensor are included with the rod and slide. A force sensor on one of the jaws may operate to disable further operation of the length sensor such that repeatable measurements may be made of soft or elastic articles. The length sensor is connected to electronic circuit components, which may include a microcomputer, for evaluation and processing of the signals supplied by the length sensor. Replaceable motherboards or memories allow the use of different processing programs for different applications, and the replacement of full memory devices such that the sliding gauge may continue to be used while the previous data is evaluated by a separate computer.

26 Claims, 9 Drawing Sheets

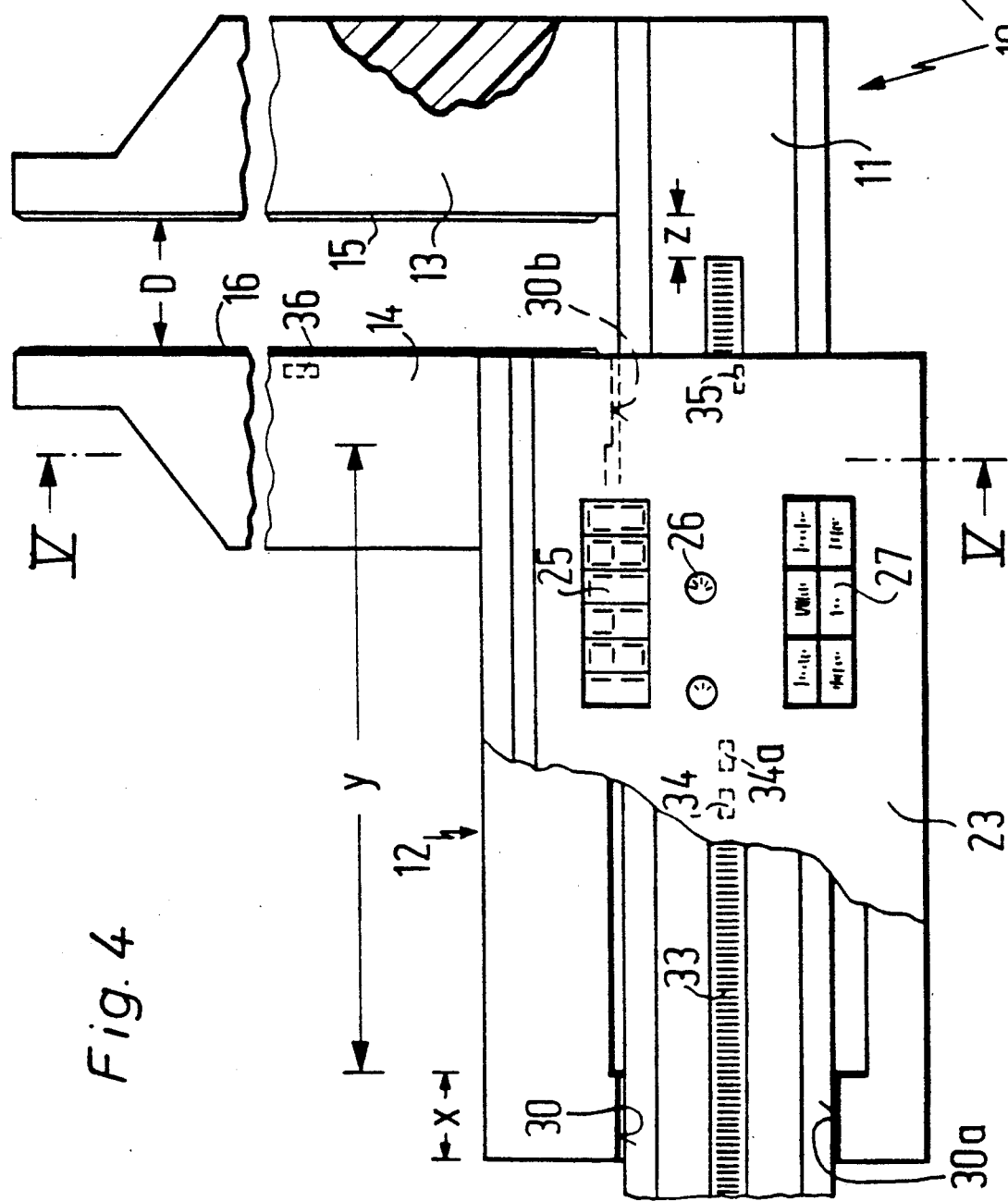

Fig. 12
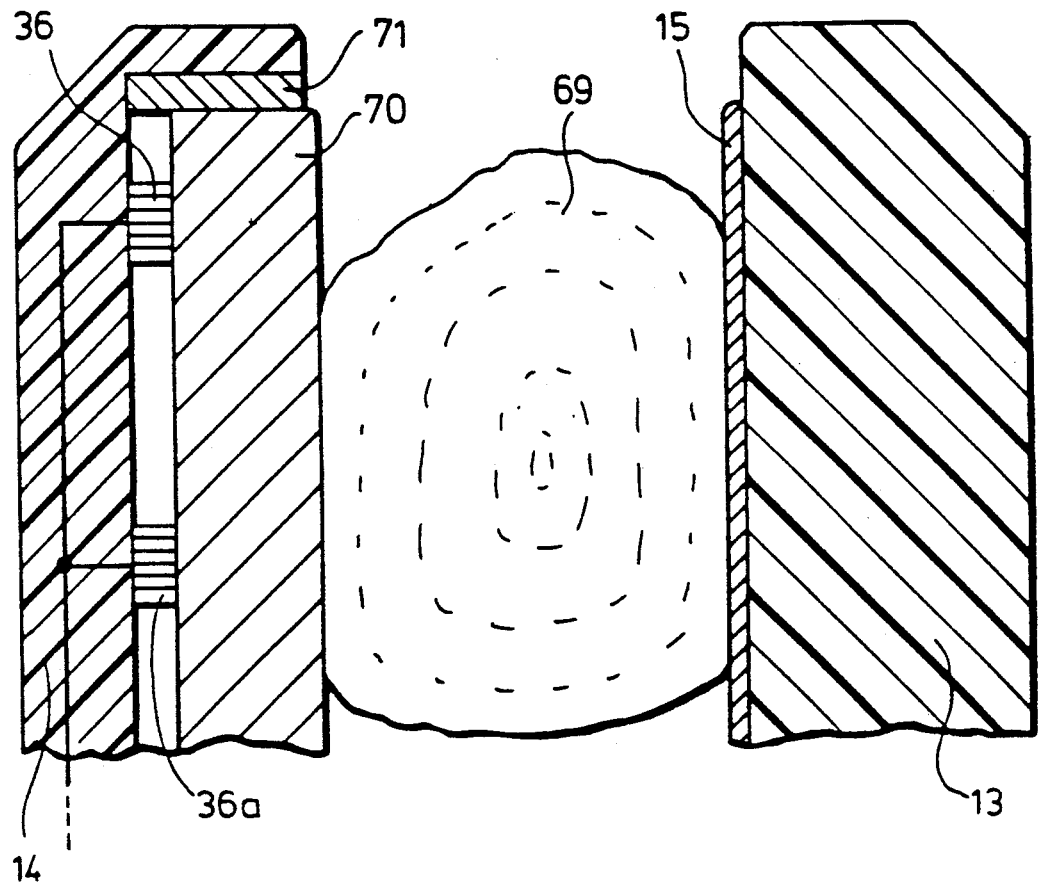
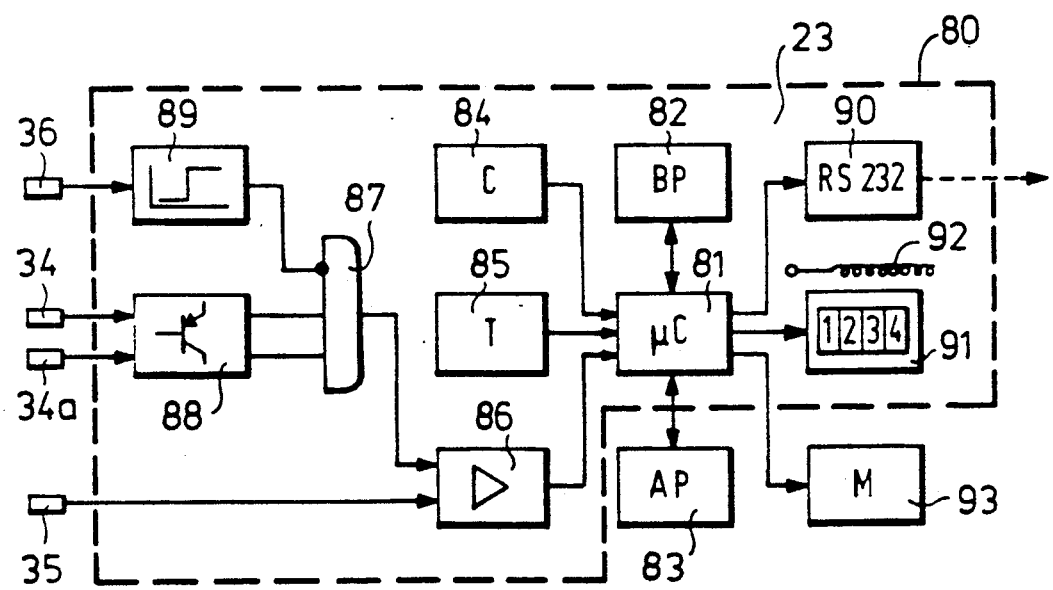
Fig. 13

SLIDING GAUGE

The present invention relates to a sliding gauge comprising a rod and a slide arranged on the said rod for being displaced in the longitudinal direction, by means of form-locking guiding means, said rod and slide being equipped each with one jaw projecting at a right angle therefrom and extending in parallel to each other, the said rod and slide comprising between them at least one longitudinal marking interacting with at least one length sensor and the at least one length sensor being connected to electronic circuit components arranged on the slide for evaluating signals received from the sensor.

A sliding gauge of this type has been known from U.S. Pat. No. 4 226 024.

Further, the present invention relates to applications of the before-mentioned sliding gauge for measuring animals for slaughter, trunks and whole cheese.

Sliding gauges are measuring instruments similar to slide calipers and are intended for measuring the outer dimensions of relatively large objects, for example for measuring animals for slaughter, determining the diameter of trunks or whole cheese, and the like.

Accordingly, sliding gauges are in use, for example, in slaughter houses for measuring out, for example, pig halves at characteristic points with respect to the relationship between fat and muscle tissue in order to determine certain classification parameters, for example muscle substance percentages, commercial grades, or prices.

In forestry operations sliding gauges are used for carrying out series measurements in forests in order to determine the volume of mature wood in a given forest area. In this case, one makes use of the fact that when the particular species of tree and the location of the tree is known, measurements of the trunk diameter carried out at a given height permit very exact conclusions to be drawn regarding the height of the tree so that no separate measurements of the height are required within certain acceptable tolerance limits. To say it in other words, it is possible to determine the useful wood volume of a tree with sufficient accuracy by a single measurement carried out at a standardized measuring point of the tree. In addition, sliding gauges are used in forestry operations for determining the volume of cut wood in a relatively simple manner, for example if the tree has been cut to standardized lengths. By combining the values so measured with pre-determined prices it is, therefore, also possible in such cases to determine for example the price of a given wood volume.

Finally, sliding gauges of a simple type have been used also for measuring out whole cheese and, in particular, for determining its volume.

In the case of the sliding gauge according to U.S. Pat. No. 4 226 024, an electronic evaluation unit is arranged on the slide for evaluating electronically the measuring result, i.e. the longitudinal distance between the jaws which are in contact with the object to be measured. To this end, markings are provided on the broad side of the rod, in the longitudinal direction. These markings consist of non-continuous magnetic inserts which are arranged in grooves and which coact with an element which responds to magnetic fields, namely a magnetoresistive element, arranged on the slide. Viewed in the longitudinal direction, two magnetoresistive elements are arranged at a longitudinal spacing corresponding to a multiple of the division of the longitudinal graduation, plus or minus one fourth of the division, in order to enable the sense of displacement of the slide to be derived from the phase relationship of the two measuring signals produced by the magnetoresistive elements.

The slide of the known sliding gauge is provided only with an indication unit and a storage for the measured values. For further processing of these data, in particular for combining them with predetermined other parameters, in forestry applications, for example, with data regarding the particular type of the wood, the price related to the volume, etc., a separate portable data terminal is provided which may in turn be connected to a larger computer.

However, such a configuration is connected with certain disadvantages insofar as sliding gauges are frequently used under extremely rough environmental conditions, for example in forests in any weather, when felling trees, or in other fields of application of the type mentioned before.

In all these cases it is, however, a serious disadvantage that several separate units have to be handled. And the different connections that have to be established by means of cables and plugs are also disadvantageous for many reasons because they make it almost impossible to record, store and process the measured values in a reliable manner.

Another sliding gauge of the type described above has been known from DE OS 33 30 396.

This other known sliding gauge, which is intended for determining the diameter of round timber or the like, is provided with a hollow rod accommodating a linear potentiometer, preferably in an inert gas atmosphere. The free end of the rod comprises spaces intended for the installation of an electronic measuring arrangement and/or of batteries which are, however, not described in detail. No connection to an external computer is provided in the case of this known sliding gauge.

Another sliding gauge intended for forestry applications has been known from DE OS 30 26 906. In the case of this gauge, the slide carries a usual measuring tape, i.e. a coiled-up metal measuring tape, whose free end is connected to the fixed jaw so that the measuring tape is extended or retracted as the slide is displaced along the rod. This known sliding gauge can be disassembled for transportation purposes which means that the rod can be dismantled from the fixed jaw, and the movable jaw and the slide can also be removed as one unit, while the measuring tape is fixed to the slide. The electronic evaluation of measured values is neither intended, nor possible with this sliding gauge.

DE OS 28 32 986 describes a sliding gauge which comprises an electronic scanning unit arranged on the slide and coacting with an inductively scannable line pattern provided on the rod. The slide carries an evaluation unit with an indication unit and the necessary batteries. Further, the movable jaw of this known sliding gauge is arranged to turn slightly about an axis extending perpendicularly relative to the measuring plane. During this pivotal movement, the jaw is actively connected to a pressure-measuring system. This arrangement is intended to avoid the so-called Abbe's measuring errors which result from the fact that the slide tends to get tilted on the rod, due to mechanical tolerances, when the movable jaw is applied upon the object to be measured at high pressure. This slight tilting movement of the movable jaw, which can never be completely avoided, not even by high-precision production methods, leads to a measuring error because the object to be measured does not in this case form the exact extension of the longitudinal measuring rod so that when the movable jaw gets tilted, an error occurs which corresponds to the tilting angle and the distance of the object to be measured from the measuring scale. The known sliding gauge therefore provides that the measured value is read when the pressure sensor indicates that the movable jaw starts to get deflected, i.e. tilted.

Finally, DE OS 31 28 656 discloses an incremental position-measuring system which also comprises two length sensors arranged one behind the other at a spacing corresponding to a multiple of the division of the longitudinal graduation of the respective longitudinal markings, plus or minus one fourth of the said division.

Now, it is the object of the present invention to improve a sliding gauge of the type described above in such a manner that it can be used with high precision and reliably for a plurality of different measuring tasks, and even under rough marginal conditions.

This object is achieved according to the invention by the fact that the circuit components are mounted on the slide by means of detachable connection means.

This solves the object underlying the invention fully and perfectly because the electronic circuit components can be removed from and mounted on the slide as one compact unit.

This arrangement provides on the one hand the possibility to carry out a plurality of measurements in series and to transfer the storages containing the measured values to external evaluation units, and makes the sliding gauge suited, on the other hand, for the most different applications, simply by changing the electronic circuit components. To this end, the electronic circuit components may, for example, comprise storages containing programs and the respective evaluation routines for measuring values picked up on animals for slaughter, trunks or whole cheese.

According to a preferred embodiment of the invention, the circuit components are designed as microcomputers with keyboards and display elements.

This feature provides the advantage that all operation and indication elements required during a plurality of different measuring tasks are firmly integrated in the microcomputer. The user of the sliding gauge according to the invention is, therefore, in a position to perform all measurements and evaluation operations which have to be carried out at the very place by means of a single unit, namely the sliding gauge itself. It is, therefore, no longer necessary to handle several devices, to establish the corresponding cable connections, and the like.

In slaughter house applications it is possible in this manner to classify the pig halves by means of series measurements; at the same time corresponding reports can be prepared and printed out later. In particular, such measurements can be carried out in the presence of the respective breeders so that any difference that may arise later regarding the type of measurement and the evaluation of the measuring results can be excluded.

The same applies by analogy to forestry applications. In this case it is, for example, possible with the aid of the sliding gauge and corresponding evaluation of the measured values to determine, at the very place and during inspection of the wood, what work is to be carried out, for example which trees are to be felled, without the necessity to mark the trees first and to find them later.

If, in contract, a plurality of measurements have been made with the aid of the sliding gauge according to the invention, the microcomputer can be taken off the slide by only a few manipulations and can be handed over to an institute, a computer center, or the like, for further processing of the data. The sliding gauge itself can be re-used immediately by attaching a new microcomputer so that optimum utilization of the unit is ensured.

According to a preferred embodiment of the invention, the microcomputer is provided with a mounting plate which has one portion designed as part of the form-locking guide and which can be connected with a guiding part of the slide, with another portion of the slide forming another part of the form-locking guide.

This feature provides the advantage that a particularly compact design is obtained because the mounting plate of the microcomputer is directly part of the form-locking guide. In addition, this enables the sliding gauge to be easily disassembled, for example for cleaning after extended use in dirty surroundings.

This applies in particular when the mounting plate can be clicked upon the guide part, as provided by one embodiment according to the invention.

This latter arrangement provides the advantage that the microcomputer can be removed and attached again with one flick of the wrist, and all necessary connections can be established simultaneously.

According to one preferred variant to this embodiment of the invention, a length sensor is provided at the microcomputer.

This feature, which is rendered possible also by the fact that the mounting plate of the microcomputer is in direct contact with the rod, provides the advantage that all necessary connections can be made within the mounting plate so that no separate connection means are required.

This also benefits the operating safety of the sliding gauge according to the invention.

According to another preferred variant of this embodiment of the invention, a sensor is arranged on the slide and the detachable connection means are equipped with electric connection means.

This feature is of advantage in all those cases where it is intended, or necessary, to arrange additional sensors on the slide itself. If one puts up with the somewhat complexer design which is due to the additional detachable connection means, a certain expansion of the measuring tasks that can be performed with the aid of this gauge can be achieved in some cases, as will be explained in greater detail further below.

In one preferred embodiment according to the invention, the cross-section of the rod has the shape of a double prism with a high rectangular central portion and flat trapezoidal upper and lower portions.

This feature provides the advantage that the rod can be given a particularly sturdy design and that at the same time a perfect form-locking guide can be obtained.

According to a preferred variant of this embodiment of the invention, a longitudinal marking is provided in the area of the broad side of the rectangular center portion. According to another variant, a longitudinal marking can be provided alternatively, or additionally, in the area of the upper and/or lower faces of the trapezoidal upper and/or lower sections. It is, however, also possible to provide several such longitudinal markings on several sides of the rod.

These features applied either alternatively or in combination, depending on the required properties or envisaged application, make it possible to achieve an optimum of mechanical stability and precise guiding.

According to another embodiment of the invention, the longitudinal marking is provided in the rod, in covered-up arrangement.

This feature, which may be implemented for example by embedding the longitudinal marking in a pouring plastic compound, protects the longitudinal marking from abrasion so that precise measurements are rendered possible over extended periods of use.

According to another embodiment of the invention, the rod is designed as a hollow section comprising a cavity, and the longitudinal marking is provided on the inner wall of the cavity.

These features combine in itself the advantages of minimum weight and high mechanical stability of the rod, with a minimum of wear of the longitudinal scale which is arranged inside the cavity, protected from environmental influences.

According to certain preferred embodiments of the invention, the slide is provided with inserts in the sliding faces and the rod is in contact only with these inserts, by inclined surfaces of its trapezoidal upper and/or lower sections.

This feature provides the advantage that a particularly precise, though at the same time easy-running mechanical guide is obtained.

This objective is achieved also when the rod is made from a plastic material and the inserts in the sliding surface consist of a metal, for example a ground nonferrous metal.

This feature makes use of the fact that certain plastic materials run particularly smoothly on ground nonferrous metal surfaces.

In some embodiments of the invention the slide is provided with a passage opening for the rod and the passage opening is equipped with the form-locking guiding means only by sections in the area where the rod enters and leaves the slide.

The fact that the slide is guided by two axially spaced points provides the advantage that a particularly good "feel" is obtained, which means that the slide can be moved smoothly along the rod, though being precisely guided mechanically.

According to a particularly preferred embodiment of the invention, the slide and the rod are made essentially from a carbon fiber/epoxy compound (CFP).

This feature provides the advantage that minimum weight is combined with maximum strength and, at the same time, optimum resistance to environmental influences, in particular dirt and humidity.

According to a preferred variant of this embodiment, a guiding part and mounting plate of the slide, as well as the jaws, are made from a solid carbon fiber/epoxy compound, while the rod is designed as hollow section consisting of a carbon fiber/epoxy compound.

These features provide the advantage that they combine optimum stability and minimum weight. For, one must keep in mind that as a rule sliding gauges of the type which is of interest here have to be carried by their users over long distances so that special demands must be placed on such gauges as regards their weight, as well as their insensitivity to environmental influences, such as rain, snow or contaminations of all kinds.

In other embodiments of the invention, the longitudinal marking consists of a ladder-like structure whose rungs are set off in the longitudinal direction by one division each, and the length sensor can be displaced, together with a permanent magnet and a magnetic field responsive element, across the rungs of the structure, in parallel to the latter and at a certain distance therefrom.

This feature provides the advantage that the design of the longitudinal marking is extremely simple and of a purely passive nature and that the intended measuring effect if produced by the fact that the magnetic field generated by the permanent magnet is modulated by the passing rungs as the slide is displaced across the latter and that this modulation can be picked up by means of the magnetic field responsive element.

Alternatively, the longitudinal marking may be designed as a series of permanent magnets which are set off in the longitudinal direction by one division each, with the length sensor and an element responsive to magnetic fields being arranged to slide relative to this series, at a distance from the permanent magnet.

This feature provides the advantage that the slide need not carry a separate permanent magnet, but has to be equipped only with an element which is sensitive to magnetic fields, although in this case permanent magnets have to be provided for forming the longitudinal marking.

In the case of the embodiments described before, a particularly good effect is achieved by the fact that the magnetic field responsive element is designed as differential element, preferably as a differential magnetoresistive element or differential Hall element, arranged in bridge connection.

This feature provides the advantage that variations in the measuring conditions, in particular temperature variations, can be effectively compensated.

According to another variant of these embodiments of the invention, another element responsive to magnetic fields is arranged beside the first element, at a longitudinal distance equal to a multiple of a division, plus or minus one fourth of a division.

This feature on the one hand provides the advantage that by evaluating the phase relationship between the two signals generated by the magnetic field responsive elements it is possible to derive conclusions regarding the direction in which the slide is moving along the rod, while on the other hand it is possible in this case, with the aid of conventional evaluation circuits, to obtain longitudinal measurements of high resolution, with an accuracy of one fourth of a division.

According to other embodiments of the invention, the adjacent longitudinal edges of the jaws are provided with linings of a mechanically resistant material, preferably of stainless steel.

This feature provides the advantage that those surfaces which are exposed to the highest mechanical stresses, namely the measuring edges of the jaws, are optimally protected.

According to still other embodiments of the invention, one longitudinal edge of a non-swinging jaw is provided with a force sensor for sensing the compression force of the jaws when the measuring object is enclosed between the latter.

This feature provides the advantage that it is possible in this manner to take into account the particular conditions existing when the sliding gauge according to the invention is used for measuring out objects having a deformable consistency. This may be the case, for example, with animals or parts of animals when these are to be measured according to the invention in slaughter houses, for determining roughly the volume of meat obtained or to be obtained, the proportion of muscle substance, commercial grades, or the like. For, in such applications of the sliding gauges the measuring result is determined to a high degree by the force at which the user presses the sliding gauge upon the object to be measured, for example a pig half. The same applies by analogy to whole cheese, etc.

In order to avoid any misunderstandings, it should be mentioned at this point that the before-mentioned arrangement of a force sensor on one jaw is by no means comparable with the arrangement according to DE OS 28 32 986 mentioned at the outset. In the case of this sliding gauge, the movable jaw, instead of being mounted rigidly on the slide as in other designs, is expressly arranged to swing and to permit a certain pivotal movement so as to enable any tilting movement of the jaw to be detected, whereas in the case of the sliding gauge according to the invention it is of greatest importance that the jaw provided with the force sensor be arranged rigidly on the slide or the rod in order to avoid any tilting. The force sensor is intended to ensure that the gauge is always in contact with the deformable object at a predetermined standardized compression force so that the same compression force is invariably applied for all measurements of such objects. Consequently, the distance from the rod at which the object is contacted by the jaws is without any importance in the case of the sliding gauge according to the invention because the jaws are permitted to slide only in the direction of the rod, within the tolerance limits of interest in the present case. In contrast, the point of contact of the jaws is of great importance in the case of the known sliding gauge because here the tilting movement of a jaw is to be detected and because the measuring jaw will of course tilt the more the farther the point of contact is displaced to the outside or, to say it in other words, the greater the torque exerted upon the jaw becomes during compression of the gauge.

According to a preferred improvement of the embodiment just described, the force sensor is connected to a threshold stage whose output signal reflects the momentary value of the length sensor when a predetermined limit value of the signal of the force sensor is exceeded. It is thus possible, in an advantageous manner, to calibrate the measuring result to a predetermined standardized force value because the length value is stored when this predetermined value (and, accordingly, a defined degree of compression of the "soft" object) is reached. Alternatively, such storing may be effected also by locking the slide on the rod mechanically against further deflection when the predetermined force value is reached.

Another particularly preferred embodiment of the invention is characterized by the fact that a position sensor coacts with a position mark between the slide and rod in such a manner that the position sensor generates a zero signal for the microcomputer when the jaws are in contact with each other.

This feature provides the advantage that the sliding gauge can be reset to zero at desire between the individual measurements because the electronic arrangement for recording and displaying the length, i.e. the spacing between the jaws, can be calibrated to a zero value when the position sensor responds and the jaws are in the closed position.

According to a preferred practical embodiment of this variant, the position mark is formed by the fact that the longitudinal marking coacts also with the position sensor and the longitudinal marking is limited in such a way that the position sensor leaves the zone of interaction with the longitudinal marking when the jaws get into contact with each other.

This feature provides the advantage that the "jaws closed" position can be indicated in a particularly simple manner as the position sensor will generate a zero signal only in this position so that this zero signal can be used directly for calibrating the electronic arrangement.

In this embodiment of the invention, an arrangement is particularly preferred where the ladder-like structure is provided on the rod and ends at a certain distance from the jaw of the rod, the position sensor being arranged on the slide in a position substantially flush with one measuring edge of the jaw of the slide and coacting with one continuous stringer of the ladder-like structure.

This feature provides the advantage that no separate position marks are required because the ladder-like structure of the longitudinal marking described before can be directly utilized for this purpose. For, the position sensor is always located above the continuous stringer of the ladder, in all open positions of the sliding gauge, so that it supplies a continuous "sliding gauge open" signal. Only in the closed position of the jaws is the position sensor displaced laterally away from the stringer of the ladder-shaped structure, which has ended before in the longitudinal direction, so that the before-mentioned zero signal is emitted only in this position.

According to another embodiment of the invention, the microcomputer is set up according to CMOS technology.

This feature provides the advantage that the current consumption of the microcomputer is negligible - a factor which is of particular importance for portable units in view of the limited storage capacity of lightweight accumulators.

According to another embodiment of the invention, the microcomputer is provided with a standardized interface for connection to external computers.

This feature provides the advantage explained at the outset, namely that the minicomputer as a whole may be connected directly to a larger computer for performing more extensive analyses of the recorded values.

In still another embodiment of the invention, the microcomputer is provided with a detachable storage.

This feature provides the advantage that it is possible also to remove only the storage, with the values stored therein, whereafter a new storage can be inserted into the microcomputer so as to make it ready for further measurements. It is understood that the term "storage" as used in this connection may be interpreted to mean both, a measured-value storage and a program storage, so that the possibility to change the storage opens up not only the possibility to record new values, but also the possibility to prepare the sliding gauge for other measuring tasks, perhaps even such of a completely different nature. This on the one hand provides the practical advantage that the sliding gauge can be used for many different applications and is on the other hand of substantial advantage for the manufacturer because now sliding gauges can be produced in identical form for the most different applications as all those arrangements which are specific to the individual application can be made in the exchangeable storage alone.

According to preferred arrangement, the storage is a UV light erasable component.

This provides the advantage that the storages will not loose their stored data, not even under rough environmental conditions, so that a forestry worker or a slaughter house worker, for example, can carry such a component in his pocket without any risk of adulteration of the measured values.

According to another embodiment of the invention, the storage takes the form of an electronic component arranged on a motherboard, and the motherboard can be inserted into the groove of a cavity in the microcomputer arranged on the slide.

This feature provides the advantage that all necessary connections or peripheral components can be arranged on the motherboard, in addition to the electronic storage element itself, and can be plugged in and out and, thus, exchanged as one unit.

According to one particularly preferred variant of this embodiment of the invention, the cavity has a substantially cylindrical shape and can be tightly sealed by means of a screw cap.

This feature provides the advantage that once the motherboard has been inserted it can be sealed humidity-tight so that inspite of the exchangeability of the motherboard the sliding gauge can be used even under rough environmental conditions, in particular under conditions of high relative humidity.

Another variant of this embodiment of the invention is characterized by the fact that two cavities for batteries and for the motherboard are arranged side by side along one longitudinal edge of the substantially square microcomputer and can be tightly sealed by means of screw caps.

This feature on the one hand offers the advantage to ensure humidity-tight accommodation of the batteries, in the same manner as described before for the motherboard. In addition, the arrangement of the cavities along the longitudinal edge of the square microcomputer is insofar advantageous as it makes the cavities easily accessible since the square housing of the minicomputer projects beyond the rod so that the screw caps can be easily gripped and screwed on or off from the side. In addition, one obtains in this manner a housing of attractive appearance.

Another preferred variant of this embodiment of the invention consists in that the microcomputer comprises a housing consisting of two half shells, that grooves for accommodating seals are provided in the contact plane of the half shells, and that the contact plane intersects the cavities in the axial direction.

This feature provides the advantage that an absolutely humidity-tight arrangement is obtained also with respect to the remaining inner space of the microcomputer housing as the seals are pressed into the all-round grooves when the two half shells are assembled and, possibly, screwed together whereby the housing is sealed humidity-tight all around. The feature that the contact plane intersects the cavities in the axial direction provides the advantage that when the screw caps are screwed on, the half shells are simultaneously screwed together because the outer thread portion of the housing extends over both half shells so that the latter are automatically joined as the screw caps are screwed in place.

Another preferred improvement of the invention is characterized in that the lower half shell is provided with a handle projecting therefrom, preferably, at an angle of 90°.

This feature provides the advantage that handling of the sliding gauge according to the invention is very much facilitated due to the fact that the slide can be held by the grip from below whereby a mechanical abutment is obtained in case the user should wish to press the keys on the keyboard of the microcomputer with his other hand.

It has been mentioned before that the sliding gauge according to the invention is intended for a plurality of different applications.

One particularly preferred first application of the sliding gauge consists in the use for measuring out animals for slaughter, in particular animal halves, in which case the measured values are evaluated by the circuit components to derive classification parameters for the animals, such as muscle substance percentages, commercial grades, etc.

Another application of the sliding gauge according to the invention lies in the field of measuring trunks, in which case the circuit components make use of the measured values for determining other trunk dimensions, wood volumes, prices, etc.

Finally, the sliding gauge according to the invention is also used for measuring whole cheese, in which case the circuit components make use of the measured values for determining the state of maturity, volumes, prices, etc.

All these applications have the common advantage that a number of additional values of the measured objects can be determined, or commercial measuring results can be computed from classification parameters, with the aid of a relatively simple mechanical measuring device in combination with an integrated electronic evaluation system.

Other advantages of the invention will become apparent from the following description and the attached drawing.

It is understood that the features that have been described before and will be explained hereafter may be used not only in the stated combination, but also individually or in any other combination, without leaving the scope of the present invention.

Certain embodiments of the invention will now be described in greater detail with reference to the drawing in which:

FIG. 4 shows a partly simplified top view, with certain parts broken away or shown in cross-section, of one embodiment of the sliding gauge according to the invention;

FIG. 5 shows a simplified section taken along line V—V in FIG. 4;

FIG. 12 shows a detail, in greatly enlarged scale, of the free ends of second jaws for illustrating another embodiment according to the invention;

FIG. 13 shows a largely schematized circuit diagram illustrating a microcomputer of the type used according to the invention;

Figure 1:
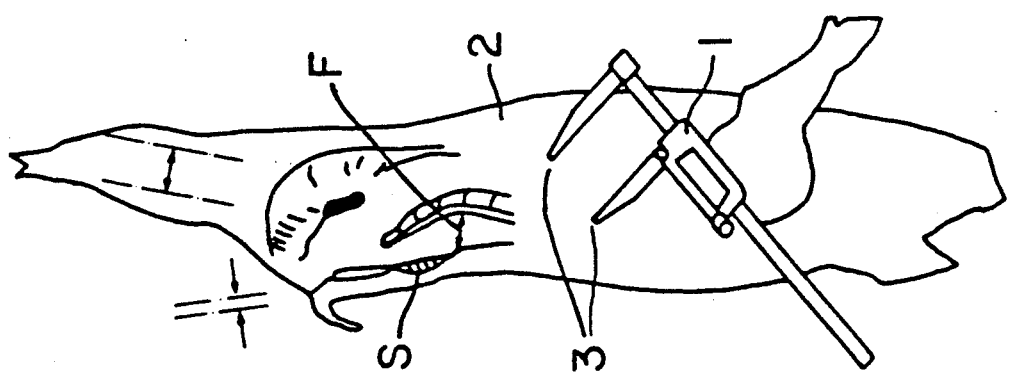
FIG. 1 shows a very diagrammatic representation illustrating the use of the device according to the invention for measuring out a pig half.

Referring now to FIG. 1, reference numeral 1 designates a sliding gauge, i.e. a measuring device resembling slide calipers, which will be described in greater detail further below with reference to FIGS. 4 to 18.

In the representation shown in FIG. 1, the sliding gauge is used for measuring a pig half 2 at defined points 3. The points 3 are anatomically defined points of the pig half 2 suited for measuring the thickness of muscle substance and fat layers, in particular in the lumbar region of the pig half 2. The values obtained by measuring the distance between the defined points 3 can then be used for computing classification parameters with the aid of predetermined algorithms. It is possible in this manner, for example, to determine at first by means of a predetermined formula the proportion of muscle substance related to the total meat substance, i.e. the so-called muscle substance percentages. These percentages can then be converted into commercial grades, using a predetermined conversion table. If the pig half 2 is suspended on a scale during measurement, or if the weight of the pig half 2 is known, then the weight of the pig half 2 can be entered additionally into an evaluation unit of the sliding gauge 1 whereafter the total price of the pig half 2 can be calculated, provided the price per kilogram has been entered, too.

The sliding gauge 1 according to the invention can be applied in this manner, for example, for measuring standardized dimensions of pig halves, as prescribed by the "Regulation amending the regulations of commercial law" issued by the Federal Republic of Germany on Dec. 18, 1986.

The before-mentioned Regulation provides that all pig carcasses, which are offered for sale classified according to the legal commercial grades, must have been measured according to predetermined criteria.

To this end, the carcass must be weighed as soon as possible after slaughtering, but not later than 45 minutes after the pig has been killed. For measuring out the pig half a method is applied the first step of which consists of measuring the "fat ratio" (S) indicated in FIG. 1. This dimension indicates the thickness of fat, measured at the point of the smallest thickness of the fat (including the rind) above the musculus glutaeus medius. The measurement is taken in mm.

Thereafter the so-called "meat ratio" (F) is determined. This term describes the thickness of the psoas, measured as the shortest connection line between the cranial end of the musculus glutaeus medius and the dorsal edge of the spinal canal. This measurement is also made in mm.

Thereafter, the so-called muscle substance proportion can be computed by inserting the fat ratio (S) and the meat ratio (F) into the following formula:

$$\text{Muscle substance proportion } MF (\%) = 47.978 +$$
$$(26.0429 \times S/F) + (4.5154 \times \sqrt{F}) -$$
$$(2.5018 \times lgS) - (8.4212 \times \sqrt{S})$$

Once the muscle substance proportion MF has been calculated in this manner, it can be used for determining the commercial grades of different types of pig carcasses, a muscle substance proportion MF of more than 55% corresponding, for example, to a commercial grade E, while lower percentages correspond to commercial grades U, R, O and, if the muscle substance proportion MF is lower than 40%, to a commercial grade P.

The before-mentioned Regulation provides in addition that records are to be kept of any determination of the muscle substance percentage of a pig half. Such record must state at least the serial slaughter number, the individual measured values, the result derived therefrom, as well as the slaughter date and the name and mark of the official who performed the classification. According to the provisions of the Regulation, these records are to be preserved in an orderly manner for a time of at lest six months.

It will be easily seen from the above explanations that the sliding gauge according to the invention is optimally suited for the described application since on the one hand it enables the necessary dimensions (fat ratio S and meat ratio F) to be determined with high reliability and accuracy, while on the other hand it also permits to determine, for example, the algorithm for the muscle substance percentage MF described by the above formula, by means of a suitable application software, and even the conversion of the muscle substance percentage to commercial grades is possible by simple tabulation of the results. Finally, the preparation of exact records and storage of the measured results also do not present any problems because these operations, too, can be carried out easily by the electronic circuit components of the sliding gauge according to the invention.

It should be noted, however, once more that the field of application of the sliding gauge according to the invention is by no means limited, neither in slaughter house applications nor elsewhere, to such operations prescribed by law, but may of course be used also for performing other usual measurements on animals already slaughtered or to be slaughtered, for example measurements of the so-called bacon angle on pig halves, and the like.

Figure 2:
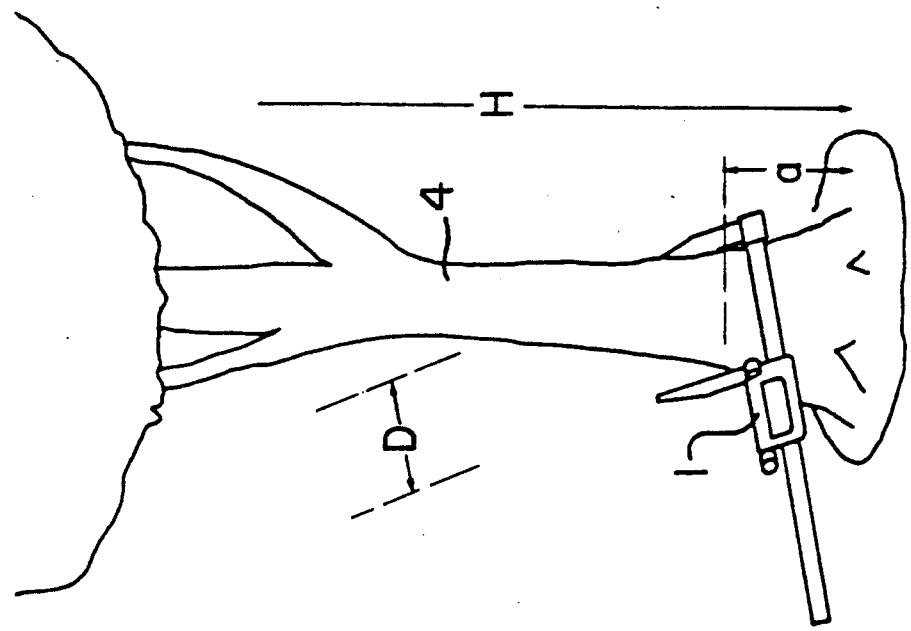
FIG. 2 shows a likewise very diagrammatic representation illustrating the use of the device according to the invention for measuring out a trunk.

FIG. 2 illustrates another application of the sliding gauge 1 according to the invention, namely for measuring a tree 4. In this case, the sliding gauge 1 is applied to the trunk at a predetermined distance a from the ground, and one determines the diameter D of the trunk at this point a. It is generally known in forestry circles that when the tree species and the location of the tree 1 is known, the value D permits conclusions to be drawn with sufficient accuracy regarding the height H of the tree. If, therefore, the stated data, i.e. the tree species, the location, and the like are entered into the evaluation unit of the sliding gauge 1, then the measured diameter D can be converted immediately to the height H of the tree and, if the conicity of the trunk is known, to the useful wood volume of the tree 4.

Figure 3:
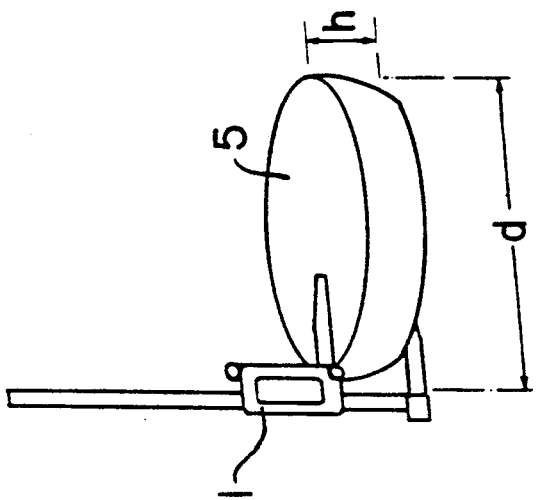
FIG. 3 shows a likewise very diagrammatic representation illustrating the use of the device according to the invention for measuring out a whole cheese.

FIG. 3 shows another application where the sliding gauge 1 is used for measuring out a whole cheese 5. For this purpose it may be necessary, for example, to measure the height h and the diameter d of the usually disk-shaped whole cheese 5. Given the fact that a whole cheese 5 is originally produced in a mold of given dimensions, the deviation of the dimensions h and d from the dimensions of the mold can be regarded as a measure for the degree of maturity of the cheese 5. So, it is possible in this application, too, to store corresponding algorithms in the evaluation unit of the sliding gauge 1, whereby the measured values h and d can be converted directly to a parameter which is representative of the degree of maturity of the whole cheese 5.

It is understood that in all the before-mentioned applications the measured values, as well as the parameters derived therefrom, may be stored for a plurality of measurements and evaluated at some later time in a manner which will be described in greater detail further below.

In FIGS. 4 and 5 reference numeral 10 designates generally one practical embodiment of a sliding gauge of the type that may be used for one of the applications described above with reference to FIGS. 1 to 3, or for other applications.

A rod 11 of double-prismatic cross-section carries a slide 12 arranged thereon for longitudinal displacement. One end of the rod 11 is provided with a first jaw 13 which projects from the rod at a right angle and which coacts with a second jaw 14 provided in parallel arrangement to the first jaw 13 at the right end of the slide 12 (as viewed in FIG. 4). The neighboring measuring edges of the jaws 13, 14 are provided with stainless steel linings 15, 16 in order to increase their mechanical strength when the jaws 13, 14 are intended for repeated measurements on hard objects.

As can be seen in the cross-sectional drawing of FIG. 5, the double-prismatic rod 11 encloses a cavity 17. The rod 11 is embraced, at five of the totally eight surfaces of the double-prismatic shape, by a guide part 20 of the slide 17. The remaining three surface portions are embraced by a mounting plate 22 arranged for receiving a microcomputer 23. On the upper side of the guide part 20 one can see a groove 24 in which the second jaw 14 is fitted.

The surface of the microcomputer 23, which rises preferably in the form of a desk, is equipped with numerous display and operating elements. For example, a digital display 25 may indicate the monetary distance D between the measuring edges of the jaws 13, 14, while control elements 26 may, for example, indicate that the unit is ready for operation, or display the number of measurements already taken. A keyboard 27 may serve, for example, to input measuring parameters, for example, code figures for certain types of objects to be measured (if trunks are to be measured for example the tree species, or the price per m$^3$ of timber, or the location of the tree).

In order to enable the slide 12 to be displaced on the rod with mechanical precision, though easily and free from tilting, a form-locking guide 30, 30a, 30b . . . is provided only at the lateral edges of the slide 12, viewed in the longitudinal direction. It is clearly seen in FIG. 4 that the guides 30, 30a, 30b extend only over a relatively small section x of the length of the, slide 12, while between these sections x a free space y is left where the slide 12 is not guided at all. In one practical example, the length ratio y:x is, for example, equal to approx. 10:1, and the free space may in practice have a length of 150 mm, for example.

One can further see in FIG. 4 that a magnetic longitudinal marking 33 has been applied on the broad side of the rod 11. The slide 12 carries length sensors 34, 34a above the longitudinal marking 33, and a position sensor 35 can be seen at the right edge of the slide 12. Finally, the second jaw 14 is equipped with a force sensor 36 near its measuring edge. The operation of these sensors 34, 34a, 35, 36 will be described in greater detail further below.

The enlarged sectional drawing of FIG. 5 illustrates once more the double-prismatic rod 11 comprising a central rectangular portion and trapezoidal upper and lower portions. The inclined surfaces of these trapezoidal portions are indicated by reference numeral 40. The rod 11 is guided in form-locking manner only in the area of these portions 40, through corresponding elements of the slide 12. In the embodiment represented in FIG. 3, sliding surface inserts 41 are provided for this purpose on the guide part 20, while a corresponding sliding surface insert 42 is provided on the mounting plate 22. The sliding surface inserts 41, 42 consist, preferably, of a metal, in particular of a nonferrous metal such as brass or bronze or the like, with ground or polished surface. A particularly easy-running though mechanically safe form-locking guiding arrangement is obtained when the rod 11 consists of a plastic material, in particular a carbon fiber/epoxy compound (CFP).

The slide 12 and the jaws 13, 14 consist, preferably, of solid CFP, while the rod is designed as a hollow CFP section.

Figure 6:
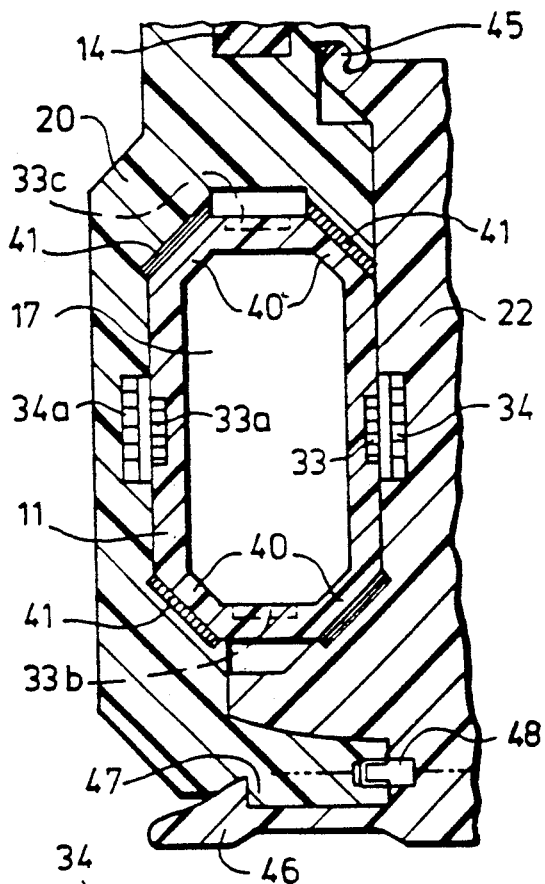
FIG. 6 shows a representation of a detail of FIG. 5, in enlarged scale.

As can be further seen in FIG. 6, the mounting plate 22 is nested by its upper right end in the guide part 20 by means of a detachable pivot connection 45. The mounting plate can then be turned about the pivot connection 45 in the clockwise direction until an elastic hook 46 engages a matching projection 47 on the guide part 20. The mounting plate 22 can in this manner be clocked into place at the guide part 20 by one flick of the wrist. Simultaneously with this operation, an electric connection indicated at 48 may be closed, if this should be necessary for connecting the components provided on the mounting plate 22 to the components provided on the guide part or on other elements of the slide 12. The details of this arrangement will be discussed in more detail further below.

It can be further seen in FIG. 6 that the longitudinal marking 33 provided on the rod 11 may be arranged in many different ways. Reference numeral 33 designates a longitudinal marking coacting with a longitudinal sensor 34 provided on the lower face of the mounting plate 22 so that the length sensor 34 can be connected directly to the microcomputer 23 which is permanently fixed on the mounting plate. Reference numeral 33a indicates, however, that the longitudinal marking may be provided also on the opposite broad side, on the latter's outside, of the double-prismatic rod 11 in which case the length sensor 34a coacts with this longitudinal marking 33a. Reference numeral 33b indicates that the longitudinal marking may also be provided on the narrow side, the flat portion of the trapezoidal section of the double-prismatic rod 11, and then on its inside, so that the longitudinal marking 33b is located in or adjacent the hollow space 17. It goes without saying, however, that the longitudinal marking may be provided also on the outside of the rod 11 in this position, too, as is indicated by reference numeral 33c.

In addition, it is also absolutely possible, within the frame of the present invention, to provide the longitudinal marking on the slide, in particular on the guide part 20 or the mounting plate 22, and to arrange the sensors on the rod 11. In this case, the microcomputer may be connected to elements of the rod 11, or else the sensor signal may be returned to the slide 12, depending on the specific requirements of the particular case.

Figure 7:
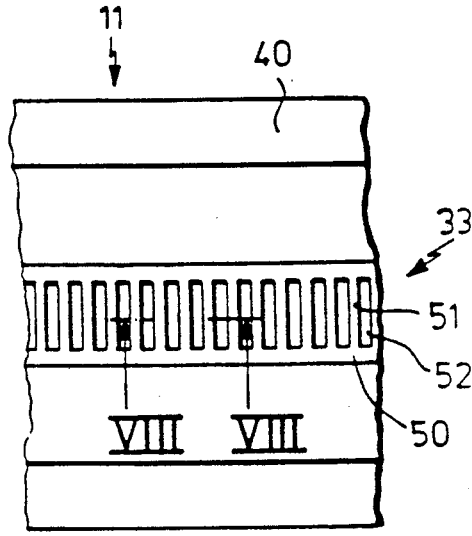
FIG. 7 shows a top view of a rod, partly broken away, of the type used in the embodiment represented in FIG. 6.

The side view of FIG. 7 illustrates the details of one embodiment of a magnetic longitudinal marking 33. The longitudinal marking 33 is designed in this case as a ladder-like structure the stringers 50 of which enclose between them rungs 51 alternating with interspaces 52. In one practical example, this ladder-like structure consists of a metal band having a width of approx. 12 mm and a thickness of 0.5 mm, which may be punched with high precision in such a manner that the distance between rung 51 and the next rung 51, i.e. the division T, is equal to approx. 2 mm (with high reproducibility). The width of the rungs 51 may, for example, be equal to 30% of the division T, the stringers 50 may have a width of approx. 2 mm.

In the still further enlarged cross-section represented in FIG. 8 one can see the rungs 51, 51a, 51b, 51c, 51d, 51e . . . in the rod 11, the rungs 51 being recessed, i.e. arranged below the surface of the CFP compound.

At a certain distance above the rungs 51 . . . one can see a length sensor 34 which in this embodiment of the invention consists of a magnetic field responsive element 60, for example a magnetoresistive element, a Hall element, or the like. Beside the magnetic field responsive element 60, a permanent magnet 61 can be seen whose field lines are indicated by 62. As is easily seen, the field lines 62 are distorted by the rungs 51 . . . when the guide part 20 moves in the direction indicated by 63 so that the field lines 62 passing through the element 60 are modulated rythmically as the rungs 51 . . . pass by.

Another length sensor 34a, consisting likewise of a magnetic field responsive element 60a and a permanent magnet, can be seen in this example beside the length sensor 34 and at a certain longitudinal distance therefrom. The distance between this other length sensor 34a and the length sensor 34 is equal to 3¼ divisions or, to say it in general terms, to n divisions plus or minis ¼ division. It is possible in this conventional manner to determine the direction of displacement of the guide part 20 relative to the rod 11, and also to improve the resolution of the length measurement to ¼ division.

Figure 8:
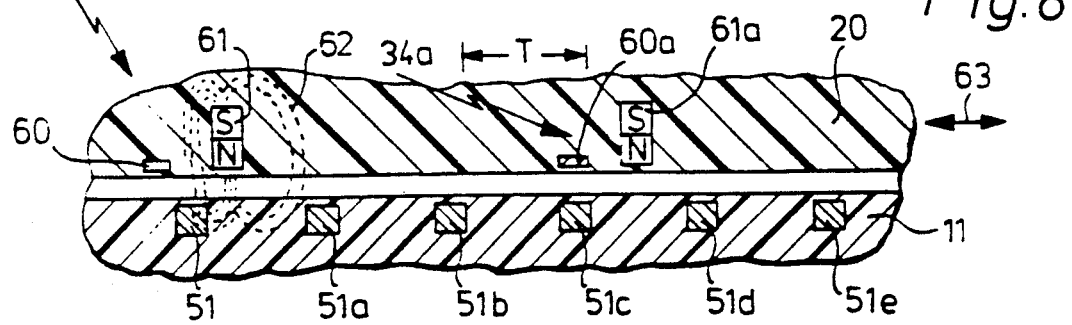
FIG. 8 shows a still further enlarged sectional view of a detail illustrating the utilized measuring effect.
Figure 9:
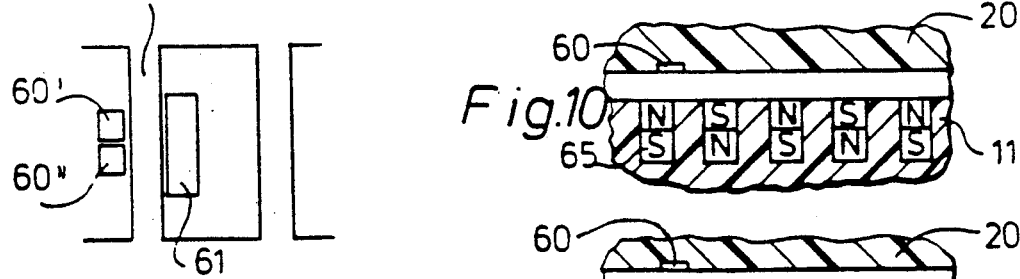
FIG. 9 shows a top view of a detail of the arrangement illustrated in FIG. 8.

The top view of FIG. 9 showing the measuring arrangement of the length sensor 34 of FIG. 8 illustrates that instead of using a single magnetic field responsive element 60 two such elements 60' and 60" may also be used in order to build up, with the aid of such a differential magnetoresistive element or differential Hall element, a corresponding bridge circuit for temperature compensation or the like.

Figure 10:
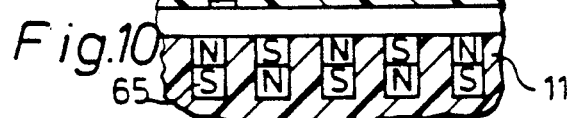
FIG. 10 shows a first alternative to the representation of FIG. 8.

In the variant illustrated in FIG. 10, only the magnetic field responsive element 60 is arranged on the guide part 20. The rod 60 carries a longitudinal marking in the form of axially offset permanent magnets whose poles, which are reversed in alternating succession, reaching up to or near the surface of the rod 11. One obtains in this manner an active, magnetically discontinuous length profile on the rod 11 which can be scanned by the magnetic field responsive element 60 without any additional means.

Figure 11:
FIG. 11 shows a second alternative to the representation of FIG. 8.

The same applies by analogy to the other variant according to FIG. 11, which differs from the arrangement described above only in that permanent magnets 66 are arranged without any axial spacing and that equal poles of the permanent magnets 66 reach up to or near the surface of the rod. In this case, too, an active, magnetically discontinuous length profile is obtained which can be scanned by means of the magnetic field responsive element 60.

FIG. 12 shows an enlarged detail representation illustrating a deformable object 69, for example the pig half 2 shown in FIG. 2 or the whole cheese 5 shown in FIG. 3, enclosed between the free ends of the jaws 13, 14.

In cases where the object 69 is so soft that it gets deformed already under the action of the forces normally exerted when the jaws 13, 14 are closed, the measuring result will necessarily not be reproducible. This is the reason why in the embodiment shown in FIG. 12 the measuring edge of the second jaw 14 is designed as a measuring bar 17 which is movable in the longitudinal direction and guided in lateral guides which are indicated in the drawing only schematically. Below the measuring bar 70 one can see the one or more force sensors 36, 36a which serve to determine the force exerted by the jaws 13, 14 upon the object 69 to be measured. The design of the guides 71 is such that the several force sensors 36, 36a are activated uniformly, regardless of the distance between the object 69 and the rod 11, while the measuring rod 11 is simultaneously prevented from tilting in the guides 71.

As regards a possible axial movement of the measuring bar 70, this is not intended, or only permissible insofar as it is required to generate a sufficient measuring effect in the force sensors 36, 36a. It is understood that the axial movement required in this case for the measuring bar 70 must be smaller than the desired length resolution of the sliding gauge 10 by at least one order of magnitude.

The evaluation circuit of the minicomputer 23 illustrated in FIG. 13 is accommodated in a water-tight housing 80, as will be explained in more detail further below, in connection with another embodiment of the invention. The core of the evaluation circuit consists of a microcomputer 81 which is connected on the one hand to an integrated operating program storage 82 and, on the other hand, to an exchangeable application program storage 83. The application program storage 83 contains, for example, measuring programs for different applications, in particular for the applications in slaughter houses, forestry operations and in cheese-production operations that have been described before.

Additional input signals are supplied to the microcomputer 81 via a calendar/day clock 84, for documentation of the measuring time, a keyboard 85 for the input of measuring parameters, and an electronic measuring system 86 by which values picked up by the sensors, 34, 34a, 35, 36 are processed.

The electronic measuring system 86 is connected, for example, to a circuit having the function of an AND gate 87, two inputs of the AND gate 87 being connected to bridge amplifiers 88 of the length sensors 34, 34a. Another inverted input of the AND gate 87 leads to a threshold stage 89 which is supplied with signals from the force sensor 36. Finally, another input of the electronic measuring system 86 is connected to the position sensor 35.

The output of the microcomputer 81 is connected to a standardized interface 90, for example an RS-232 interface which permits the microcomputer 81 to communicate with an external data processing system.

An LCD display 91 serves for displaying momentary measured values for computed characteristic values. A heating 92 serves for heating up the LCD display 91 in case the outside temperature should drop below a predetermined value, for example 10° C.

Finally, the measured values, or the characteristic values computed therefrom, may be stored in an external storage 93 designed preferably as a UV light erasable storage element.

The operation of the circuit illustrated in FIG. 13 is as follows:

To begin with, the user of the sliding gauge inserts into the microcomputer 23 an application program storage 83 especially designed for the particular application. An example of the mechanical design of the respective elements will be described in detail below, with reference to FIGS. 17 and 18.

By closing the jaws 13, 14 the electronic measuring system is initially reset to zero. This is effected by means of the position sensor 35 shown in FIG. 4, which may be designed in a manner similar to the length sensors 34, 34a, but which is arranged above the stringer 50 of the ladder-like structure shown in FIG. 7. The position sensor 35, therefore, generates a continuous "on" signal in all open positions of the sliding gauge 10.

As can be seen clearly in FIG. 4, the longitudinal marking 33 ends at a distance z before the measuring edge of the first jaw 13. On the other hand, the position sensor 35 is arranged at the right edge of the slide 12. This means that when the closed position of the jaws 13, 14 is reached—and only after this position has been reached—the position sensor 35 occupies a position outside of the are of influence of the stringer 50 so that it emits an "off" signal which can be utilized for resetting to zero the electronic measuring system according to FIG. 13.

Once this calibration process—which may of course be repeated as often as desired between the individual measurements—has been completed, the length sensors 34, 34a, which are connected to corresponding bridge circuits, generate a signal corresponding to the spacing D between the jaws 13, 14, for example to the diameter D of the tree 4 in FIG. 2. The method of generating such a measuring signal has been known before, for example from the before-mentioned U.S. Pat. No. 4 226 024, so that it need not be explained here once more.

When the sliding gauge 10 is provided with a force sensor 36 allowing for the particular conditions existing in the case of soft objects, as shown in FIG. 12, the threshold stage 89 becomes active when a predetermined reference force value is exceeded. In this case, the threshold stage 89 responds and generates a positive signal which blocks the transmission of length signals received from the amplifier 88 via the inverted input of the AND gate 87. To say it in other words, the measurement is broken off when the compression force of the jaws 13, 14 exceeds a predetermined threshold value which may be pre-set, for example, in the application program storage 83 or by corresponding actuation of the keys of the keyboard 85.

The values so measured are supplied to the microcomputer 81 via the electronic measuring system 86, where they are either directly stored in the external storage or transmitted to an external computer via the interface 90, or else subjected to further computation operations for the purpose of determining characteristic values depending on parameters that have been input via the keyboard 85. The characteristic values so determined may be those that have been discussed in detail with reference to FIGS. 1 to 3, i.e. in the case of slaughter house applications the muscle substance percentages, commercial grades, or the like, in the case of forestry application the height, wood volume, price per $m^3$ of wood, and finally, in the case of cheese-production applications the degree of maturity of whole cheese. The characteristic values may be stored in the described manner and/or transmitted to other units.

FIGS. 14 to 18 illustrate another embodiment of a sliding gauge 100 according to the invention. It is stressed in this connection that this other embodiment is not opposed to the embodiment of a sliding gauge 10 that has been discussed before, but that in contrast the properties of the two sliding gauges 10, 100 may supplement and support each other if implemented jointly on a sliding gauge. In particular, the sensor systems used, the dimensions and the like, may be the same. Systematical differences between the sliding gauges 10 and 100 exist only where such differences are expressly pointed out in this description.

Figure 14:
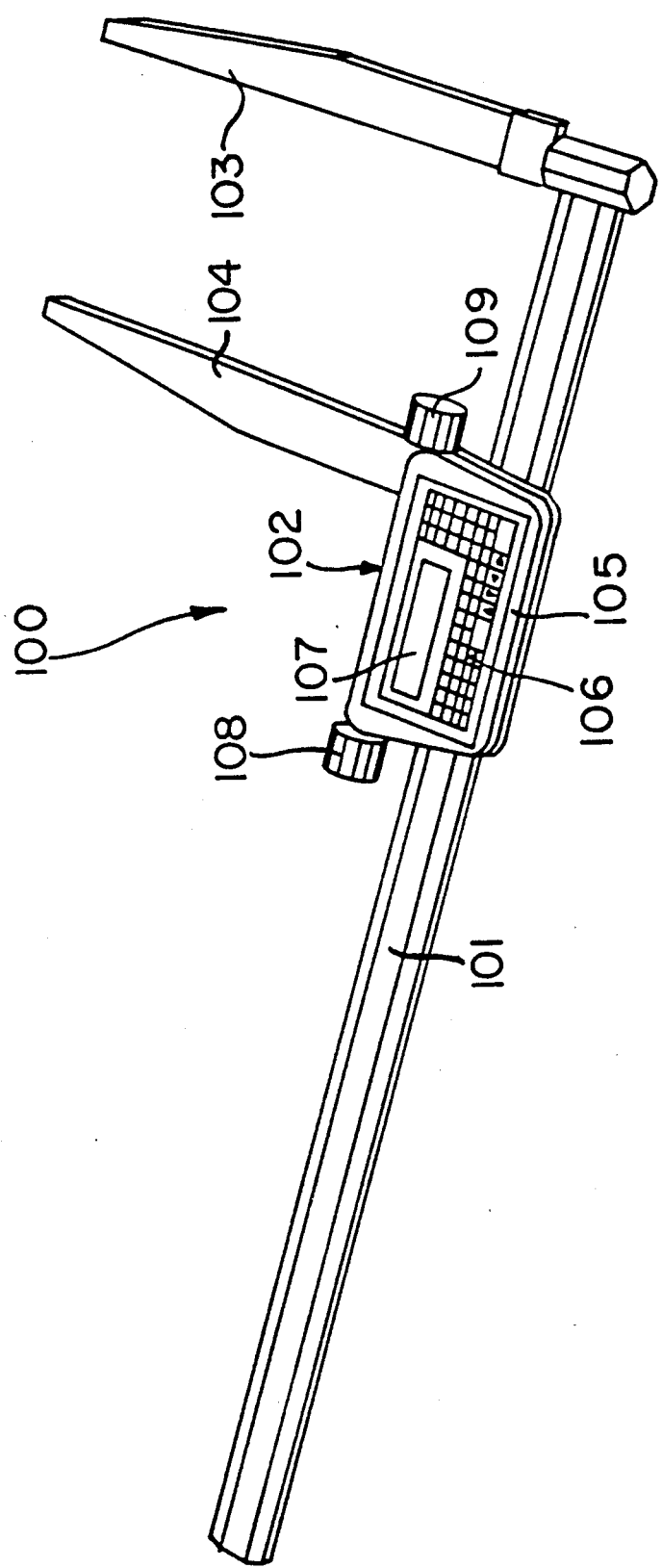
FIG. 14 is a perspective view of another embodiment of a sliding gauge according to the invention.

FIG. 14 reference numeral 100 designates the other embodiment of a sliding gauge according to the invention, comprising a rod 101 and a slide 102 running thereon. A first jaw 103 is mounted rigidly at the right end of the rod 101, while a second jaw 104 is again mounted on the slide 102.

The slide 102 carries a desk-shaped microcomputer 105 which is connected, at its upper face which is visible in FIG. 14, to a film keyboard 106. The term film keyboard is meant to describe a keyboard where no discrete keys or buttons are formed on the surface, but where the necessary switching operations are triggered by pressing defined areas of a surface of a film covering the whole surface, via contacts arranged below the film. A film keyboard has a homogenous, continuous surface and is, therefore, suited for such applications where tightness against environmental conditions, in particular environmental humidity, is required.

The microcomputer 105 comprises an LCD display 107 for alphanumerical display of values.

In the area of the left and right upper corners of the desk-shaped microcomputer 105 capsules 108, 109 are provided for receiving batteries and/or motherboards as will be explained in more detail further below.

Figure 15:
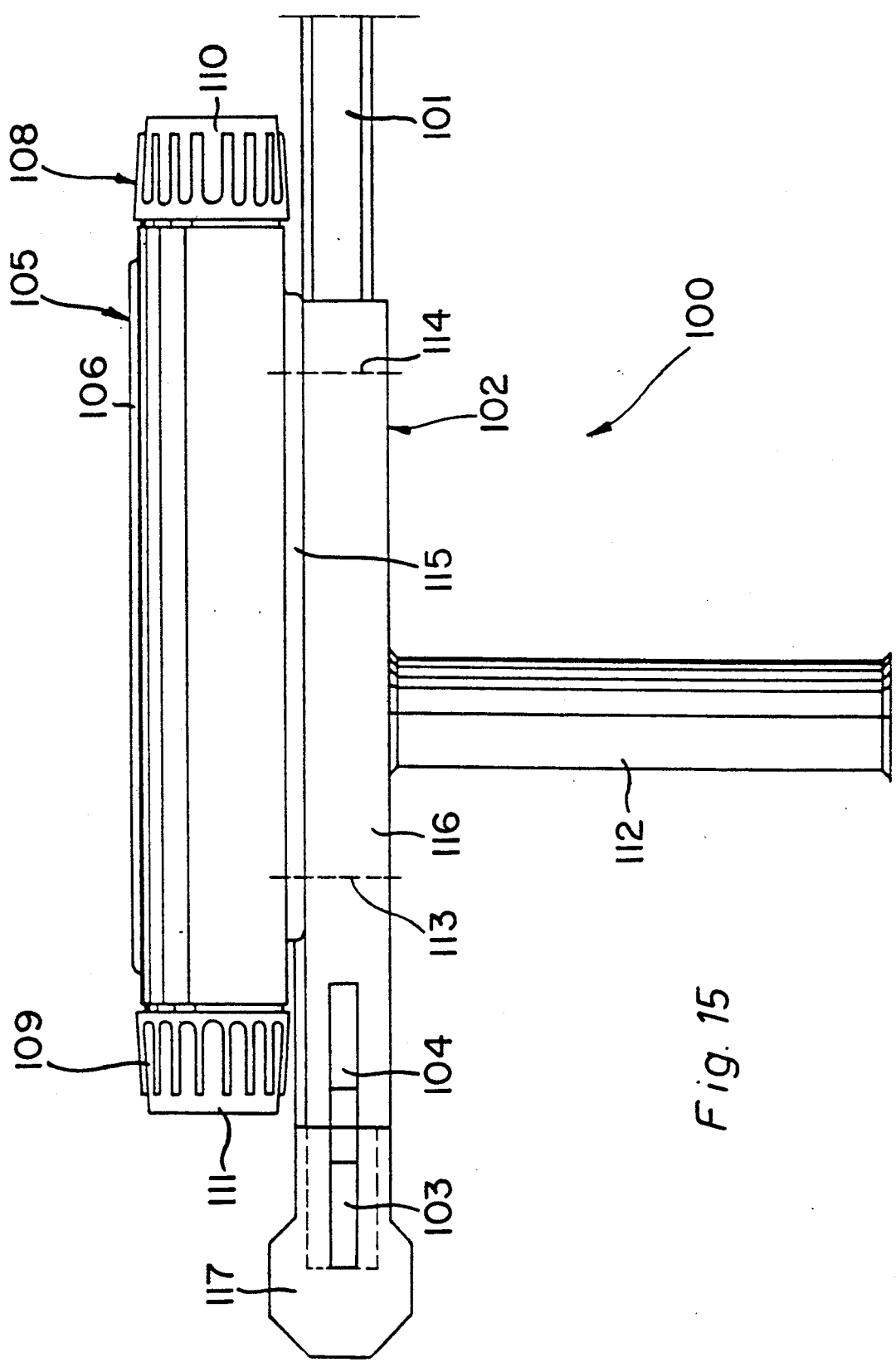
FIG. 15 shows a side view of the sliding gauge according to FIG. 14, partly broken away and in enlarged scale.
Figure 16:
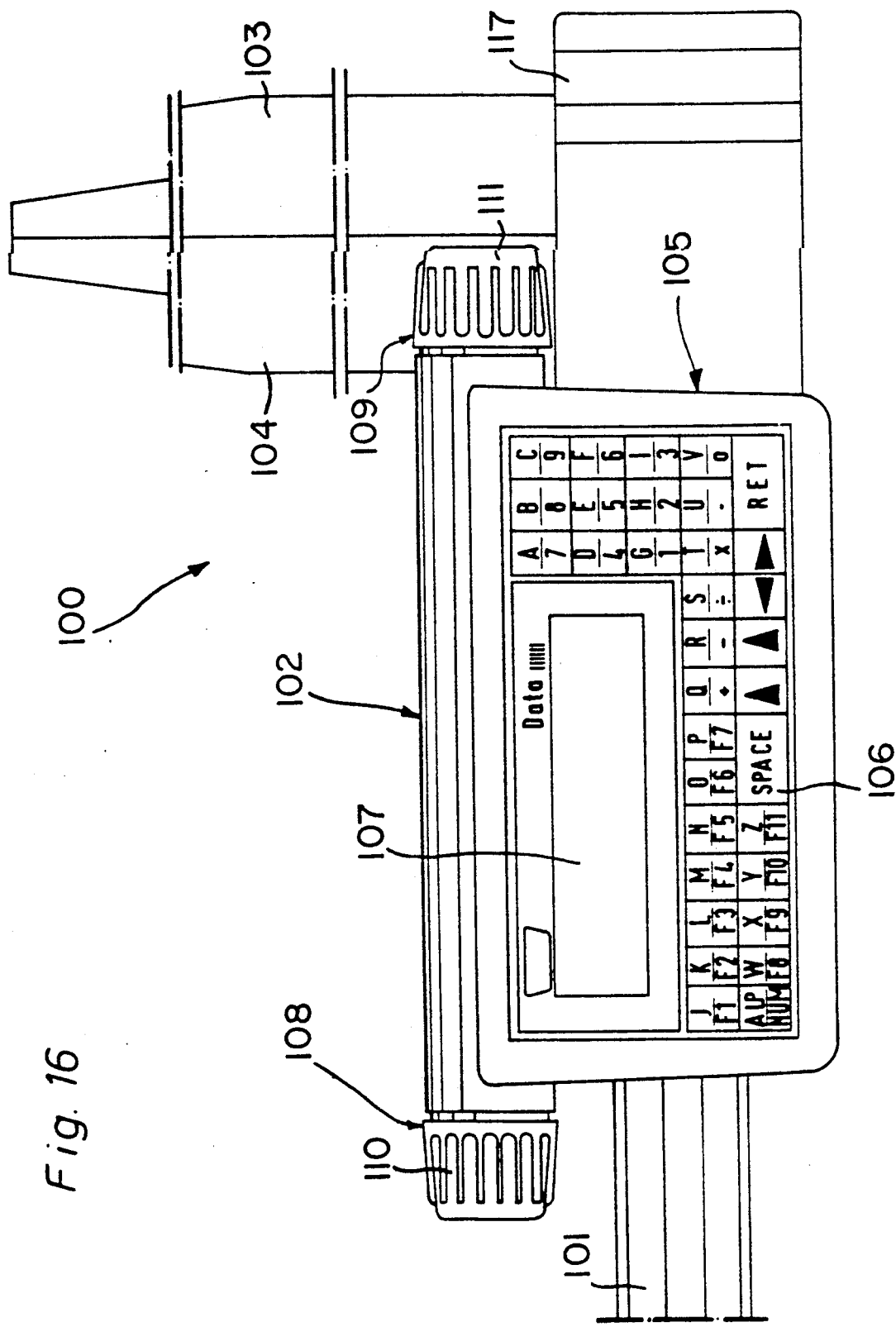
FIG. 16 shows a top view of the sliding gauge according to FIG. 14, partly broken away.

FIGS. 15 and 16 show further details of the sliding gauge 100 in enlarged scale.

In FIG. 15, which shows an elevation viewed from the direction of the jaws 103, 104, it will be seen at once that a handle 112 projects from the bottom face of the slide 102, at an angle of 90°. The user of the sliding gauge 100 grips the handle 112 by his left hand, while his right hand may hold, for example, a lateral handle 115 provided at the foot of the first jaw 103. In this manner, the jaws 103, 104 can be pulled apart and pushed together again after they have been brought into contact with the object to be measured. The fact that the bottom face of the slide 102 carries the handle 112 does not obstruct the vision of the upper face of the microcomputer 105. In addition, the microcomputer 105 is supported in this manner from below so that a right-handed person may press the film keyboard 106 from above, without thereby tilting the sliding gauge 100.

Further, FIGS. 15 and 16 show very clearly that the mounting capsules 108, 109 are provided with screw caps 110, 111 which are screwed, from the right and the left respectively, upon a cylindrical portion of the upper longitudinal edge of the microcomputer 105, as will be discussed in more detail further below, with reference to FIGS. 17 and 18.

Reference numerals 113 and 114 in FIG. 15 indicate detachable fastening means, in particular screws or a click-on connection, by means of which the microcomputer 105 can be mounted and fixed on the slide 102, via a mounting plate 115.

Reference numeral 116 indicates in this connection a guide part accommodating the rod 101 in a convenient manner, as has been described before in connection with the first embodiment.

FIG. 16 illustrates additional details of the film keyboard 106.

It can be seen that the film keyboard 106 comprises a plurality of key fields with double assignment by means of which either letters or figures can be entered into the microcomputer 105. There are further provided function keys F1, F2 . . . F11, as well as actuating keys for the basic arithmetical operations, a spacer key and a cursor function, so that all conventional input and data manipulation functions usual for process computers are available.

Figure 17:
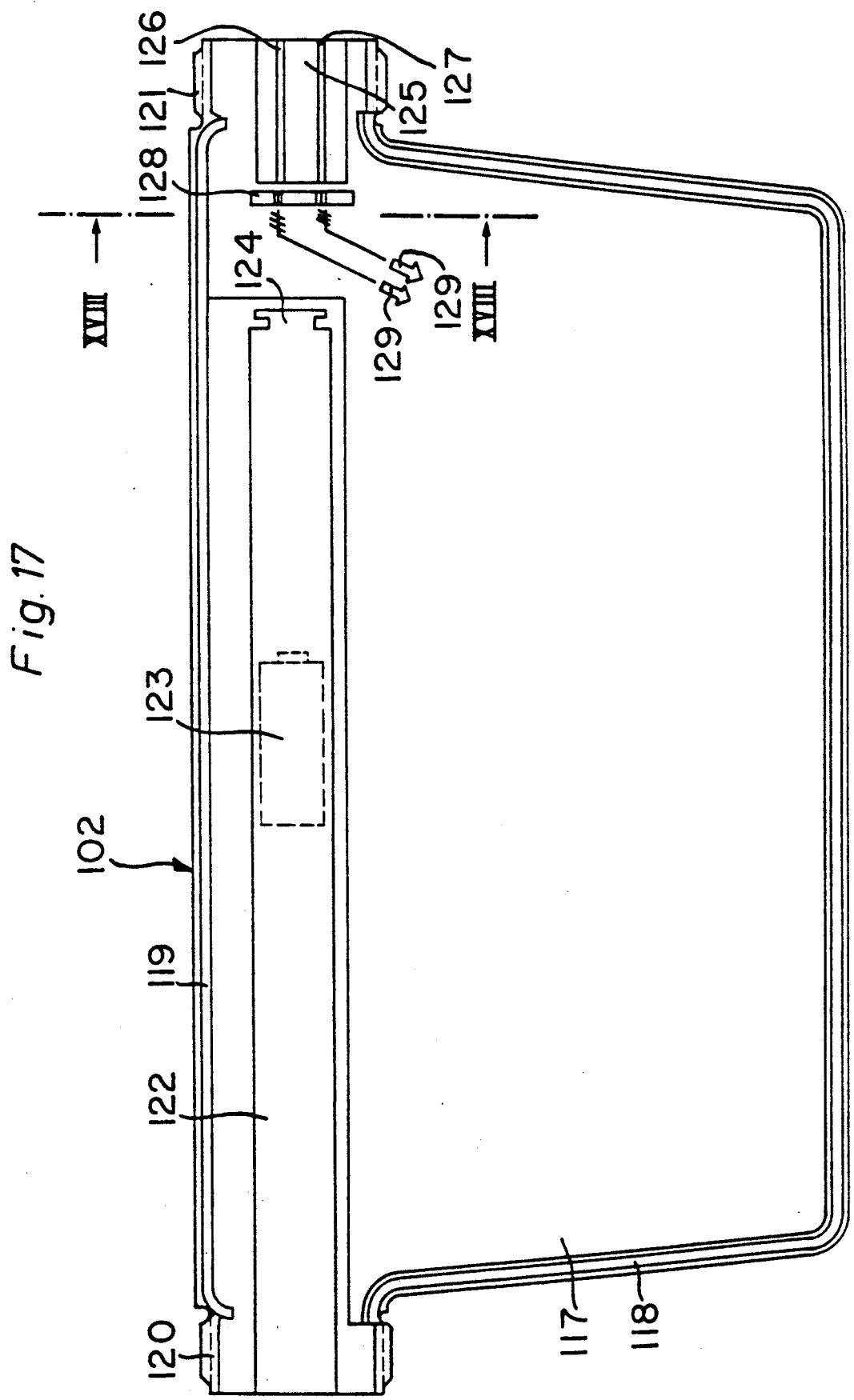
FIG. 17 shows a top view of one half shell of the housing of a type suited for the sliding gauge according to FIG. 14.

The microcomputer 105 is arranged in a housing which is divided into two half shells along a longitudinal center plane, the lower half shell being designated in FIG. 17 by reference numeral 117. The lower, flat prismatic section of the lower half shell 117—as viewed in FIG. 17—comprises a U-shaped continuous groove 118, while another continuous groove 119 is provided in the upper semi-cylindrical section. The grooves 118, 119 exhibit a semi-cylindrical cross-section and serve for accommodating elastic profiles which provide an all-round seal against humidity when the half shells are assembled.

At the left and/or right upper corner of the half shell 117, between the free ends of the grooves 118, 119, screw necks 120, 121 are formed integrally with the shell. The left screw neck 120 provides access to a first elongated mounting space 122 into which batteries 123 can be inserted in series connection through the first screw neck 120. The right end of the first mounting space 122 is equipped with a spring/contact space 124 in order to ensure that the poles of the batteries 123 are urged against each other and the required voltage can be tapped.

The second screw neck 121 encloses a second mounting space 125 of much shorter axial extension. The second mounting space 125 is provided with two grooves 126, 127 arranged one above the other. The end of the grooves 126, 127 facing away from the second screw neck 121 is followed by multi-point connectors 128 from which multi-wire data lines lead into the inner space of the housing for transporting data—indicated by 129—to the circuit components of the microcomputer 102, as has been discussed in more detail in connection with FIG. 13.

Figure 18:
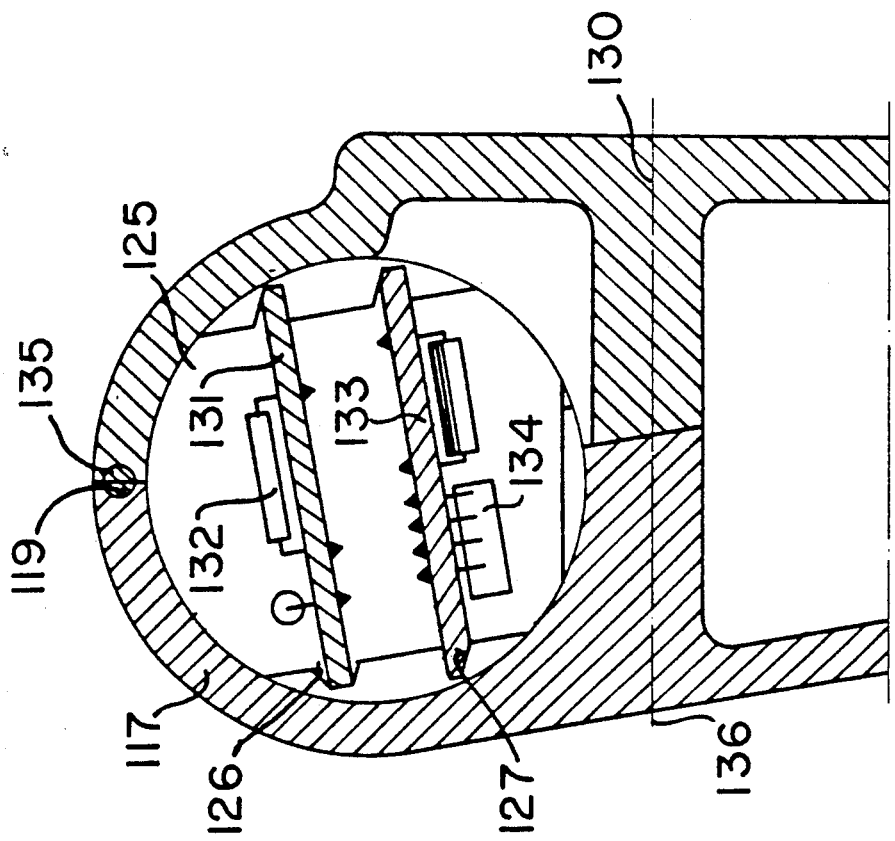
FIG. 18 shows a sectional view taken along line XVIII—XVIII in FIG. 17, in still further enlarged scale.

The enlarged cross-sectional representation of FIG. 18 shows that grooves complementary to the grooves 126, 127 are provided in an upper half shell 130 of the housing of the microcomputer 102. This makes it possible to insert axially into the second mounting space 125 a first motherboard 131 with electronic components 132 and, below the same, a second motherboard 133 with electronic components 134.

FIG. 18 shows at 135 the seal arranged in the groove 119, and reference numeral 136 indicates that the half shells 117, 130 can be screwed or clicked together.

The motherboards 131, 133, together with their components 132, 134, symbolize the units indicated by 83 and 93 in FIG. 13, namely an operating program storage and a measured-value storage, which can be withdrawn from the second mounting space 125, depending on the particular application of the sliding gauge 100.

For this purpose, it is only necessary to screw the second screw cap 111 off the second screw neck 121, whereafter each of the motherboards 131 or 133 can be axially withdrawn and replaced by another motherboard, either for the purpose of exchanging the operating program of the sliding gauge 100 to prepare the unit for a different application, or for removing the measured-value storage with the values recorded thereon in order to transfer them, for example, to a different data processing system.

Once the second screw cap 111 has been tightened again, a conventional seal provided in the screw cap 111 seals the second mounting space 125 completely against the outside.

Further, the two half shells 117, 130 are additionally secured mechanically in their relative positions by the fact that the second screw cap 111 engages the screw neck 121 on both, the lower half shell 117 and the upper half shell 130.

It is understood that the invention is not limited by the different embodiments described above or the individual applications discussed before. Rather, the present invention permits numerous variants which, though going beyond the special features of the discussed embodiments or of the applications described by way of example, do not leave the scope of the present invention.

It is absolutely possible, for example, to vary the geometrical design of the sliding gauge, or the selection of materials used, or the respective arrangement of the measuring arrangement and the value processing elements on the slide or rod, without departing from the present invention.

In addition, other types of sensors, for example capacitive, optical or other sensors, may be used in the frame of the present invention for detecting the length or position, without leaving the scope of the present invention.

Finally, the present invention is not limited to the three specified applications, but may be used anywhere where a measuring process for objects with direct measured-value processing is required and importance is placed on insensitivity to environmental influences and adaptability of the arrangement.

We claim:

1. A slide caliper comprising a rod and a slide, arranged on said rod for being displaced in a longitudinal direction thereon, by means of form-locking guiding means, said rod and said slide being equipped each with one jaw projecting at a right angle therefrom and extending in parallel to each other, said rod and said slide comprising between them at least one longitudinal marking interacting with at least one length sensor, said sensor being connected to electronic circuit components arranged on said slide, for evaluating signals received from said sensor, wherein said circuit components are mounted on said slide by means for detachable connection means, and are designed as a microcomputer with a keyboard and with display elements, said microcomputer being provided with a mounting plate having one portion designed as part of said form-locking guiding means and having attaching means for being attached to a guiding part of said slide, with another portion of said slide forming another part of said form-locking guiding means.

2. The slide caliper of claim 1, wherein said attaching means has elastic hooks to click said mounting plate upon said guiding part.

3. The slide caliper of claim 1, wherein said sensor is provided at said microcomputer.

4. The slide caliper of claim 1, wherein said sensor is arranged on said slide and said detachable connection means is provided with electric connection means.

5. The slide caliper of claim 1, wherein said rod has a cross-section having the shape of a double prism with a high rectangular central portion and flat trapezoidal upper and lower portion.

6. The slide caliper of claim 5, wherein said longitudinal marking is provided on a broad side of said rectangular center portion.

7. The slide caliper of claim 5, wherein said longitudinal marking is provided on an upper and/or lower face of said trapezoidal upper and lower sections.

8. The slide caliper of claim 6, wherein several longitudinal markings are provided on several sides of said rod.

9. The caliper of claim 7, wherein said longitudinal markings are provided in said rod, in covered-up arrangement.

10. The slide caliper of claim 7, wherein said rod is designed as a hollow section comprising a cavity, said longitudinal marking being provided on an inner wall of said cavity.

11. The slide caliper of claim 7, wherein said slide is provided with inserts in sliding faces thereof, and said rod is in contact only with said inserts, by inclined surfaces of its trapezoidal upper and/or lower sections.

12. The slide caliper of claim 11, wherein said rod is made from a plastic material and said inserts in said sliding surface consist of a metal, for example a ground non-ferrous metal.

13. The slide caliper of claim 1, wherein said slide is provided with a passage opening for said rod, said passage opening being equipped with said form-locking guiding means only by sections in an area where said rod enters and leaves said slide, respectively.

14. The slide caliper of claim 1, wherein said slide and said rod are made from a carbon fiber/epoxy compound (CFP).

15. The slide caliper of claim 14, wherein said guiding part and said mounting plate, as well as said jaws, are made from a solid carbon fiber/epoxy compound, while said rod is designed as a hollow profile consisting of a carbon fiber/epoxy compound.

16. A slide caliper comprising a rod and slide arranged on said rod for being displaced thereon in a longitudinal direction, by means of form-locking guiding means, said rod and said slide being equipped each with one jaw projecting at a right angle therefrom and extending in parallel to each other, said rod and said slide comprising between them at least one longitudinal marking interacting with at least one length sensor, said sensor being connected to electronic circuit components arranged on said slide, for evaluating signals received from said sensor, said circuit components comprising a detachable memory configured as an electronic component operatively mounted on a printed circuit board, said printed circuit board being detachably and operatively inserted in a groove of a cavity of a mini-computer mounted on said slide.

17. The slide caliper of claim 16, wherein said memory is an ultra-violet light erasable circuit component.

18. The slide caliper of claim 16, wherein said memory is an electronic component arranged on a printed circuit board, said printed circuit board being inserted into a groove of a cavity of a mini-computer arranged on said slide.

19. The slide caliper of claim 18, wherein said cavity has a substantially cylindrical shape and can be tightly sealed by means of a screw cap.

20. The slide caliper of claim 19, wherein two cavities for batteries, and for said printed circuit board, respectively, are arranged side by side along one longitudinal edge of said mini-computer having a substantially square shape, said cavities being adapted to be tightly sealed by means of screw caps.

21. The slide caliper of claim 20, wherein said mini-computer comprises a housing consisting of two half shells, grooves for accommodating seals being provided in a contact plane of said half shells, said contact plane intersecting said cavities in an axial direction.

22. The slide caliper of claim 21, wherein a lower half shell is provided with a handle projecting therefrom, preferably, at an angle of 90°.

23. A slide caliper comprising a rod and a slide arranged on said rod for being displaced thereon in a longitudinal direction, by means of form-locking guiding means, said rod and said slide being equipped each with one jaw projecting at a right angle therefrom and extending in parallel to each other, said rod and said slide comprising between them at least one longitudinal marking interacting with at least one length sensor, said sensor being connected to electronic circuit components arranged on said slide, for evaluating signals received from said sensor, wherein one longitudinal edge of one of said jaws is provided with force sensor means for sensing a compression force exerted on said jaws when a measuring object is enclosed between said jaws, and for providing a force sensor signal indicating the value of the compression force.

24. The slide caliper of claim 23, wherein said force sensor means is connected to a threshold stage whose output signal reflects a momentary value of said length sensor when a predetermined threshold value of the force sensor signal is exceeded.

25. A slide caliper comprising a rod and a slide arranged on said rod for being displaced thereon in a longitudinal direction, by means of form-locking guiding means, said rod and said slide being equipped each with one jaw projecting at a right angle therefrom and extending in parallel to each other, said rod and said slide comprising between them at least one length sensor cooperating with a longitudinal marking on said rod, said sensor being connected to electronic circuit components arranged on said slide, for evaluating signals received from said sensor, wherein a position sensor coacts with a position mark between said slide and said rod such that said position sensor generates a zero signal for said circuit components when said jaws are in contact with each other.

26. The slide caliper of claim 25, wherein said longitudinal marking has a limited extension along said longitudinal direction and said position sensor is positioned such that when said jaws get into contact with each other, said position sensor gets out of interaction with said longitudinal marking.

* * * * *